United States Patent
Shao et al.

(10) Patent No.: US 9,946,713 B1
(45) Date of Patent: Apr. 17, 2018

(54) DIGITAL MEDIA RELATIONSHIP ANALYZER AND RECOMMENDER

(71) Applicant: Amazon Technologies, Inc., Reno, NV (US)

(72) Inventors: Peng Shao, Seattle, WA (US); Kemal Oral Cansizlar, Seattle, WA (US); Scott Allen Mongrain, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 953 days.

(21) Appl. No.: 13/671,598

(22) Filed: Nov. 8, 2012

(51) Int. Cl.
*G06F 17/30* (2006.01)

(52) U.S. Cl.
CPC ........ *G06F 17/30* (2013.01); *G06F 17/30997* (2013.01)

(58) Field of Classification Search
USPC ........ 707/754, 723, 769, 709, 724; 382/103, 382/100, 118
See application file for complete search history.

(56) References Cited

U.S. PATENT DOCUMENTS

| | | | |
|---|---|---|---|
| 7,117,443 B1 * | 10/2006 | Zilka et al. .................. 715/739 |
| 7,346,610 B2 * | 3/2008 | Ruthfield et al. | |
| 7,970,664 B2 * | 6/2011 | Linden et al. ............... 705/26.7 |
| 8,032,511 B1 * | 10/2011 | Skrenta et al. ............... 707/709 |
| 8,140,391 B2 * | 3/2012 | Jacobi et al. ............... 705/14.53 |
| 2003/0131142 A1 * | 7/2003 | Horvitz et al. ............... 709/313 |
| 2009/0171760 A1 * | 7/2009 | Aarnio et al. .................. 705/10 |
| 2010/0182631 A1 * | 7/2010 | King et al. .................... 358/1.15 |
| 2010/0306249 A1 * | 12/2010 | Hill et al. ...................... 707/769 |
| 2011/0307478 A1 * | 12/2011 | Pinckney et al. ............. 707/724 |
| 2012/0066199 A1 * | 3/2012 | Ramer et al. ................. 707/709 |
| 2012/0224743 A1 * | 9/2012 | Rodriguez et al. ........... 382/103 |
| 2012/0303490 A1 * | 11/2012 | Hill et al. .................... 705/27.2 |
| 2013/0041781 A1 * | 2/2013 | Freydberg .................... 705/27.1 |
| 2013/0218877 A1 * | 8/2013 | Satyanarayanan ............ 707/723 |

* cited by examiner

*Primary Examiner* — Mariela Reyes
*Assistant Examiner* — Thong Vu
(74) *Attorney, Agent, or Firm* — Thomas Horstemeyer, LLP (57) ABSTRACT

Disclosed are various embodiments for recommending a list of digital media to a user based upon digital media that the user is currently consuming. The list of recommendations is generated from an analysis of the digital media. Subsequently, the list of recommendations is stored on the user's device, and the user is alerted to the list's existence through the rendering of a notification on the user's display. Upon selection of an item from the list of recommendations, the selected digital media is rendered on the display of the user's device within the context of the user's application.

20 Claims, 10 Drawing Sheets

DIGITAL MEDIA RELATIONSHIP ANALYZER AND RECOMMENDER

BACKGROUND

Consumers of digital media routinely wish to view related digital media content. However, they often lack the knowledge necessary to find related digital media that they might enjoy given the breadth, depth, and scope of digital content available today. Although these consumers can attempt to search for related digital media, the process is inherently limited due to the lack of knowledge of the consumer.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to analyzing digital media that is currently being consumed by an application in order to provide recommendations of related, additional digital media. Additional digital media to be presented is chosen, for example, by determining the superset of all items which are related, and selecting a subset based upon information known about the user account associated with the application. These additional digital media content items are embedded in the client application in order to provide an integrated and seamless user experience where a user does not have to switch applications or otherwise break context in order to browse, purchase, rent, or render the additional digital media content.

In the following discussion, a general description of the system and its components is provided, followed by a discussion of the operation of the same.

Figure 1A:
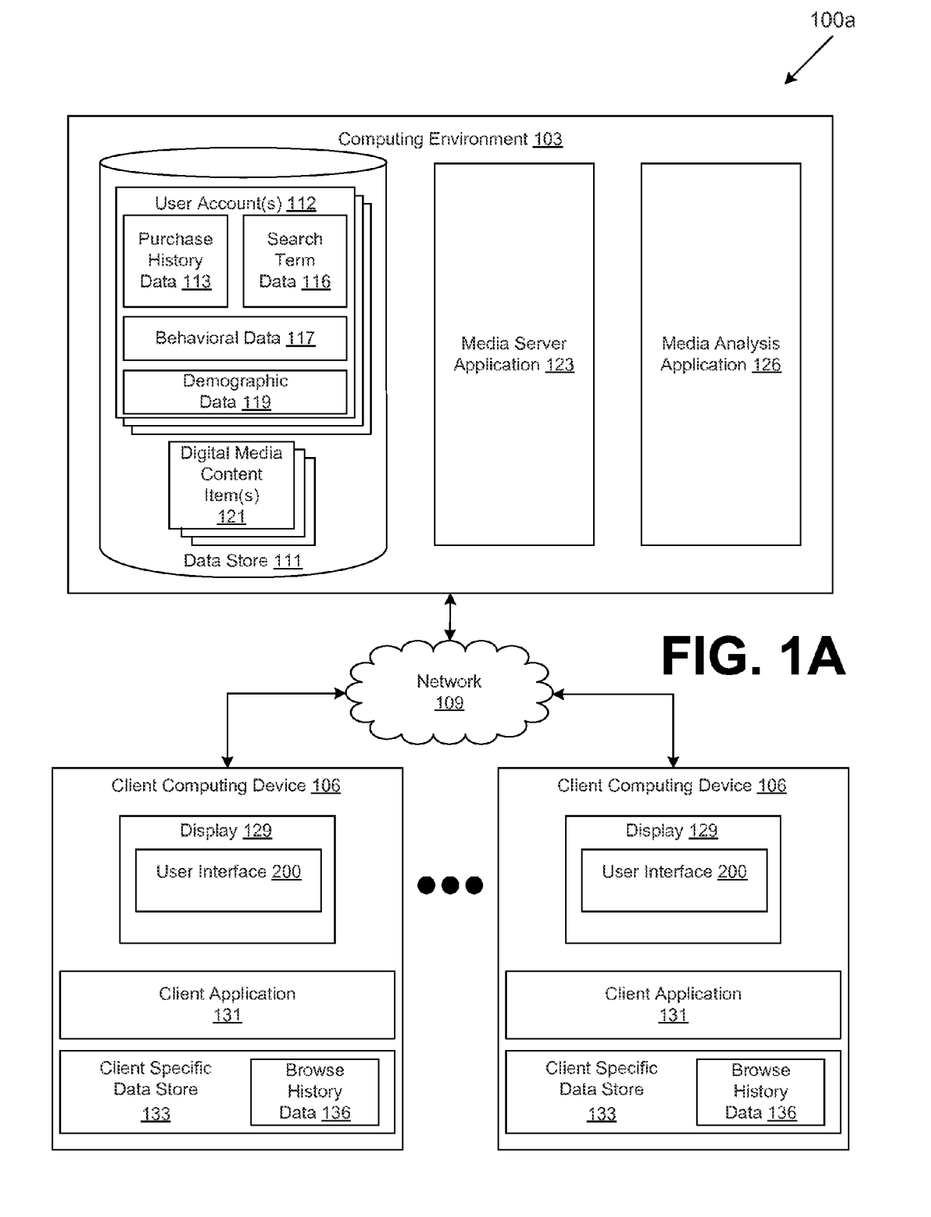
FIG. 1A is a drawing of a networked environment according to various embodiments of the present disclosure.
Figure 1B:
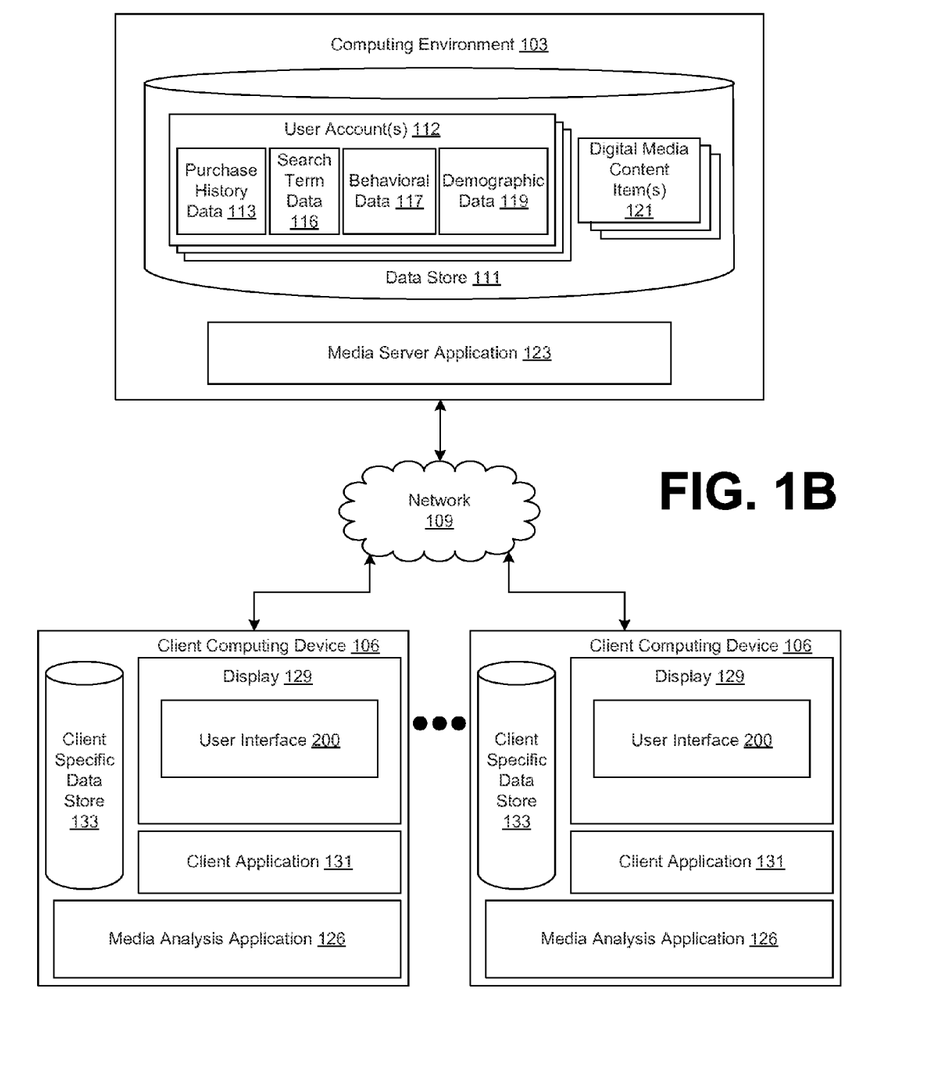
FIG. 1B is a drawing of another networked environment according to various embodiments of the present disclosure.

With reference to FIG. 1, shown is a networked environment 100 according to various embodiments. The networked environment 100 includes a computing environment 103 and at least one client computing device 106, which are in data communication with each other via a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may employ a plurality of computing devices that may be employed that are arranged, for example, in one or more server banks or computer banks or other arrangements. Such computing devices may be located in a single installation or may be distributed among many different geographical locations. For example, the computing environment 103 may include a plurality of computing devices that together may comprise a cloud computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 111 that is accessible to the computing environment 103. The data store 111 may be representative of a plurality of data stores 111 as can be appreciated. The data stored in the data store 111, for example, is associated with the operation of the various applications and/or functional entities described below.

The data stored in the data store 111 includes, for example, user accounts 112, purchase history data 113, search term data 116, behavioral data 117, demographic data 119, and one or more digital media content items 121 such as network pages (including web pages), emails, digital video, digital audio, e-books, PDF documents, and potentially other data. In several embodiments of the present disclosure, purchase history data 113, search term data 116, behavioral data 117, and demographic data 119 may be information associated with one or more user accounts 112. Purchase history data 113 may include information such as items purchased, types of items purchased, date or time of purchase, amount of purchase, promotions or discounts used in conjunction with a purchase, and potentially other data. Search term data 116 may include information related to search terms entered by a user or customer, search results returned as a result of a query using particular search terms, the frequency a search term is used, the relevancy of particular search results for particular search terms, and other related information. Behavioral data 117 includes data related to how one or more users interact with the computing environment and applications running within it, such as media server applications or electronic commerce applications. Examples of behavioral data 117 may include adding items to a wish list, ranking or providing written feedback about previously purchased items, adding items to a shopping cart of an electronic commerce system, or other similar interactions with an electronic commerce system. Demographic data 119 includes data about one or more users associated with a particular user account 112. For example, demographic data 119 related to any particular item may include occupation, residence, income level, education level, and other attributes of purchasers in relation to how likely a customer is to purchase an item. Demographic data 119 may further include information related to a specific individual or household, including the occupation, residence, income level, education level, or other attributes of a particular customer or particular members of a customer's household.

The components executed on the computing environment 103, for example, include media server application 123, a media analysis application 126, and other applications, services, processes, systems, engines, or functionality not discussed in detail herein. The media server application 123 returns one or more digital media content items in response to a request from another application. The media analysis application 126 is executed to determine a list of digital media content items that are related to the digital media content item returned by the media server application 123 and select a subset of items from the list by filtering the list based upon information associated with a user account.

The client computing device 106 is representative of a plurality of client devices that may be coupled to the network 109. The client computing device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client computing device 106 may include a display 129. The display 129 may comprise, for example, one or more devices such as liquid crystal displays (LCDs), gas plasma-based flat panel displays, organic light emitting diode (OLED) displays, LCD projectors, or other types of display devices.

The client computing device 106 may be configured to execute various applications such as a client application 131 and/or other applications. In one embodiment of the present disclosure, the client computing device 106 is also configured to execute the media analysis application 126. The client application 131 may be executed in a client computing device 106, for example, to access network content served up by the computing environment 103 and/or other servers, thereby rendering a user interface 200 on the display 129. The client application 131 may, for example, comprise a browser, a mobile application, etc., and the user interface 200 may correspond to a network page, a mobile application screen, etc. The client computing device 106 may be configured to execute applications beyond the client application 131 such as, for example, email applications, social networking applications, and/or other applications.

The client computing device 106 may also contain one or more data stores, such as client specific data store 133. Also, various data is stored in a client specific data store 133 that is accessible to applications executing on client computing device 106, such as client application 131. The client specific data store 133 may be representative of a plurality of data stores as can be appreciated. The data stored in the client specific data store 133, for example, is specific to the client computing device 106, client application 131, or users thereof. In one embodiment of the present disclosure, browse history data 136 that is often stored on a server is stored in the client specific data store 133. However, other embodiments may place the browse history data 136 on a remote data store, such as the data store 111 in the computing environment 103. Browse history data 136 includes a list of network resources accessed by a user of client application 131 as well as other data.

Next, a general description of the operation of the various components of the networked environment 100 is provided. To begin, it is assumed that a user manipulates the client application 131 or other client-based application on the client computing device 106 to request a digital media content item 121 from the media server application 123. The request may comprise, for example, a request for a network page such as a web-page or network content in some other form such as a digital image file, a digital video file, a digital audio file, an e-book, an application, or other digital media content items. The request may be communicated from the client computing device 106 to the media server application 123 using hypertext transfer protocol (HTTP), file transfer protocol (FTP), or another appropriate protocol as can be appreciated. Upon receiving such a request, the media server application 123 locates the digital media content item 121 in data store 111. The media server application 123 then returns the requested digital media content item 121 to client computing device 106.

The client computing device 106, upon receiving a digital media content item 121 in response to its request to the media server application 123, forwards the digital media content item 121 to media analysis application 126. In one embodiment of the invention, the media analysis application 126 executes in computing environment 103. The request may be communicated from the client computing device 106 to the media server application 123 using hypertext transfer protocol (HTTP), file transfer protocol (FTP), or another appropriate protocol as can be appreciated. In another embodiment of the invention, the media analysis application 126 executes on the client computing device 106. In such an embodiment, the client computing device 106 may provide a reference to the location of the digital media content item 121 to the media analysis application 126, or by another means as can be appreciated.

Upon receiving a copy of the digital media content item 121, the media analysis application 126 analyzes the initial digital media content item 121 to determine a list of digital media content items 121 that are related to the initial digital media content item 121. Analysis may depend, for example, on the nature of the digital media content item 121. In one embodiment of the present disclosure, a network page or e-book may be parsed for words, names, terms, phrases, and other logical word groups which are compared to a media library index. Digital audio files may be passed through a speech-to-text recognition ("STTR") engine to generate a transcript, which is then parsed as a text file in a manner similar to a network page or e-book. Digital image files may be passed through an optical-character-recognition ("OCR") engine to look for text or captions embedded in the image. Such text or captions may then be parsed as a test file in a manner similar to a network page or e-book. Digital video may have its audio track processed in a similar manner as a digital audio file, while individual frames of the video may be processed as a manner similar to digital image files.

After determining a list of digital media content items 121 that are related to the initial digital media content item 121, the media analysis application 126 filters the list to determine the subset of digital media content items 121 that will be provided to the client computing device 106.

In one embodiment of the present disclosure, filtering is accomplished based upon the contents of the initial digital media content item 121. In this particular embodiment, a list of a predetermined number of digital media content items 121 may be found to relate to the initial digital media content item 121 received from the media server application 123, but only a subset of these are referred to more than once. In this particular embodiment, the media analysis application 126 might filter the list of digital media content items 121 to those in the subset that are referred to more than once. For example, if a network page discussing a review of upcoming movies mentions movies "A," "B," and "C" three times each, but only mentioned upcoming movies "D," "E," and "F" once each, then the media analysis application would return the subset of A-C from the set of A-F. The media analysis application 126 would then return the filtered list of digital media content items 121 to the client computing device 106.

In a further embodiment, filtering is accomplished based upon information associated with user account 112 such as purchase history data 113, search term data 116, demographic data 119, browse history data 136, or other information. For example, a list of digital media content items 121 may be found to relate to the requested digital media content item 121. However, a relationship might exist between the browse history data 136 associated with the account of a user and a subset of the list of digital media content items 121. The media analysis application 126 may then filter the list of digital media content items 121 to those in the subset related to the browse history data 136 and return the filtered list. In a similar manner, a relationship might exist between the purchase history data 113, search term data 116, or demographic data 119 associated with the account of a user, and filtering could occur based upon this data. The media analysis application then returns the filtered list of digital media content items 121 to the client computing device 106.

It is understood that further embodiments exist wherein multiple methods for filtering the list are used in conjunction with each other. In addition, the order in which those methods for filtering the list differs from one embodiment to another.

After the list is filtered in accordance with any one of the various embodiments of the present disclosure, the media analysis application 126 returns the filtered list of digital media content items 121 to the client application 131 executing on client computing device 106. The client application 131 then renders a trigger as part of the user interface 200 on the display 129 of the client computing device 106. The trigger indicates to users that related digital media content items 121 are available. If the user interacts with the trigger, then the list of digital media content items 121 is rendered in an overlay over user interface 200 or via some other rendering approach. This permits the user to view the list without breaking the context of user interface 200. The user can choose to interact with the list either by browsing the list, or selecting a digital media content item 121 within the list to render. If the user chooses a digital media content item 121 to render, then a media player renders on the client computing device 106 the particular digital media content item 121 chosen.

Referring next to FIG. 1A, shown is one particular embodiment of the networked environment of the present disclosure, denoted herein as networked environment 100a, wherein the media analysis application 126 executes within the computing environment 103. In this particular embodiment, the media analysis application 126 executes within the computing environment 103 in order to take advantage of the additional computational resources available to the media analysis application 126 in comparison to those available to the client computing device 106.

Turning now to FIG. 1B, shown is another embodiment of the networked environment of the present disclosure, denoted herein as networked environment 100b, wherein the media analysis application 126 executes within the client computing device 106. In this particular embodiment, the client computing device 106 has sufficient computational resources for the media analysis application 126 to execute on the client computing device 106. Therefore, the workload can be distributed to one or more client computing devices 106 and computing resources available within the computing environment 103 can be conserved.

Figure 2A:
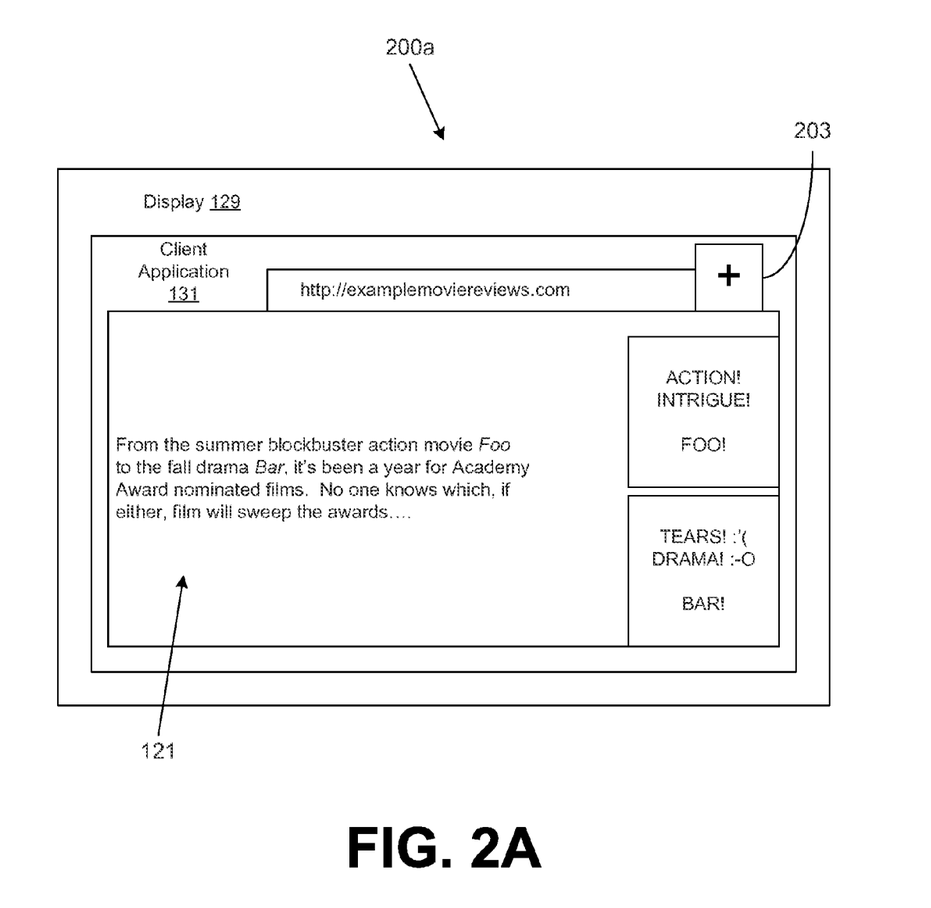
FIGS. 2A-2E are drawings of examples of user interfaces rendered by a client application in the networked environment of FIG. 1A or FIG. 1B according to various embodiments of the present disclosure.

Moving on to FIG. 2A, shown is one example of a user interface 200, denoted herein as user interface 200a, according to various embodiments. In this particular embodiment, user interface 200a is generated by a client application 131 displaying a digital content item 121 (e.g. a network page for movie reviews) on a display 129 of client computing device 106 (FIG. 1). The client application 131 presents a trigger 203 on display 129 to provide notice that client application 131 has received a list of related digital media content items 121 from the media analysis application 126 (FIG. 1). It is understood that the trigger may be presented to the user in any one of a number of embodiments, including a pop-up box, a tab, a button, a system tray icon, an audible sound notification, or other appropriate user notification. It is further understood that the client application 131 and the digital content item 121 are not limited to network pages but could also correspond to an email application and an email, an e-book reader application and an e-book, a video player and a video file, an audio player and an audio file, or any of a multitude of applications designed to consume digital media content and their corresponding digital media content.

Figure 2B:
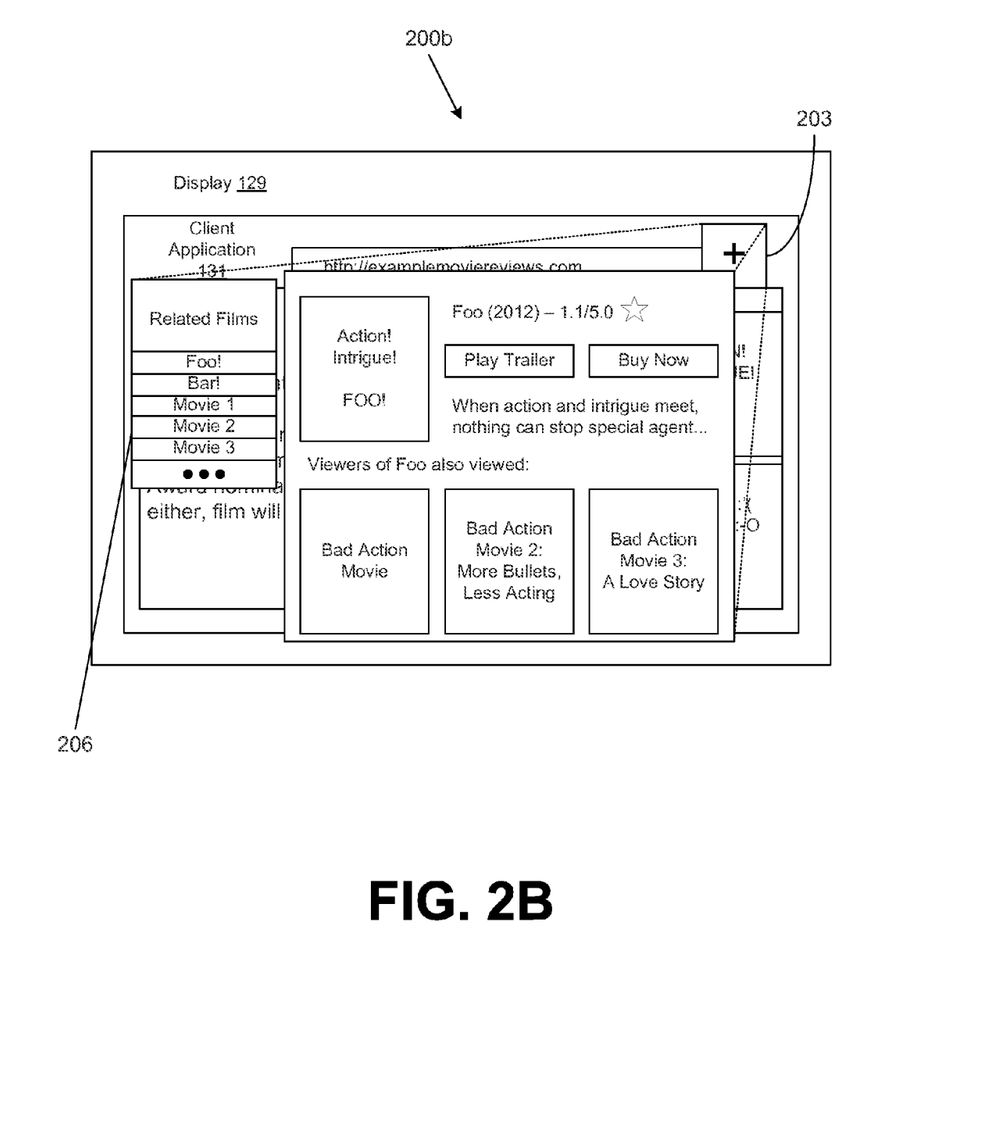

Following is FIG. 2B, which shows another example of user interface 200, denoted herein as user interface 200b, according to various embodiments, wherein trigger 203 of user interface 200a has obtained a user interaction. In this particular embodiment, user interface 200b comprises a client application 131 that has overlaid on display 129 a list 206 of digital media content items 121 (FIG. 1) such as movies mentioned in a movie review. Client application 131 may obtain a number of user interactions related to the list of digital media content items 121, including browse interactions, play interactions, purchase interactions, or other interactions appropriate to the type of media, the provider of the media, or the client application 131. Remaining underneath the overlay of the list 206 of digital media content items 121 is the original digital content media item 121 on a display 129 of the client computing device 106.

Figure 2C:
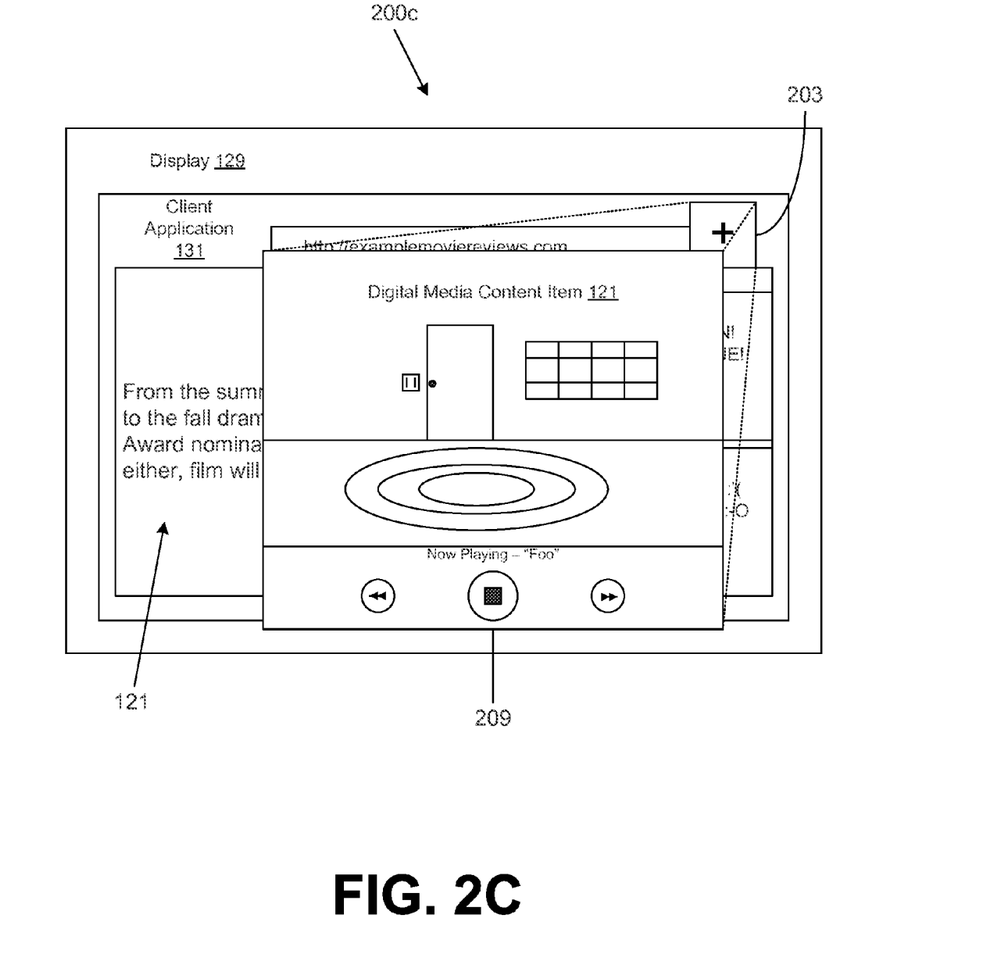

Turning now to FIG. 2C, shown is another example of user interface 200, denoted herein as user interface 200c according to various embodiments. In this particular embodiment, user interface 200c contains a digital media content item 121, such as a movie that was selected and purchased in user interface 200b. The digital media content item 121 is playing in media player 209 embedded within user interface 200 of the client application 131 and rendered on the display 129 of the client computing device 106. It is understood that playback occurs immediately in response to obtaining a user interaction. For example, if a user chooses to watch a trailer of a movie, playback of the trailer begins immediately. If a user chooses to purchase the movie, the movie is immediately acquired and playback begins contemporaneously with acquisition of the movie.

Figure 2D:
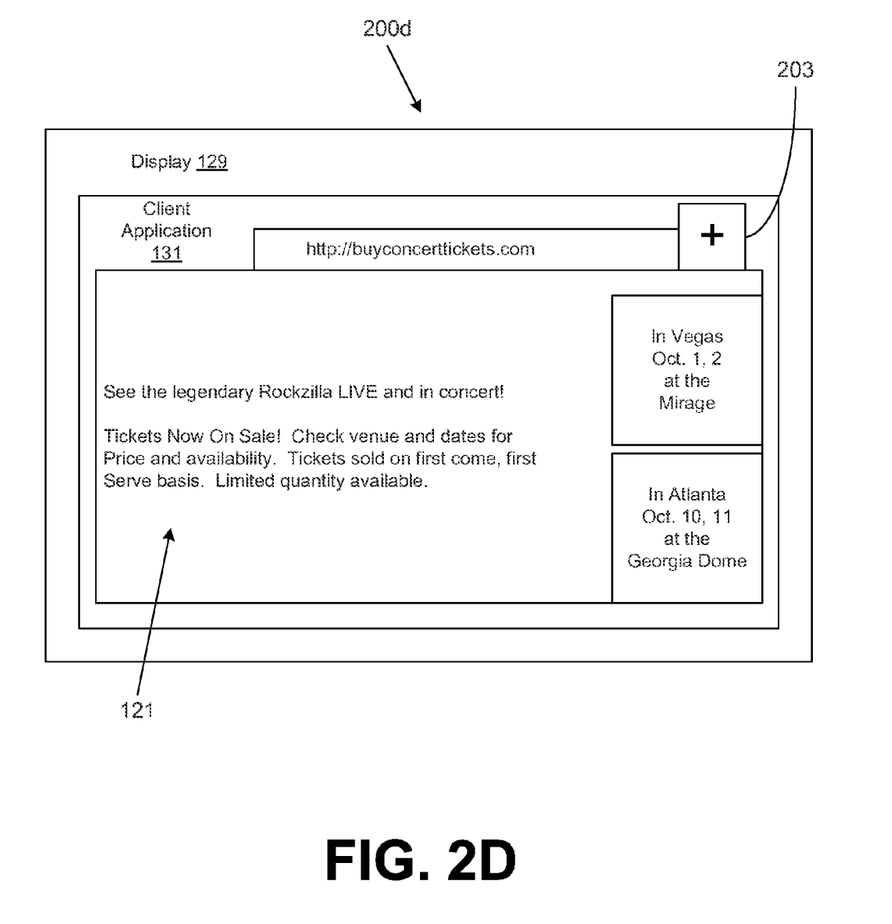

Moving on to FIG. 2D, shown is another example of user interface 200, denoted herein as user interface 200d, according to various embodiments. In this particular embodiment, user interface 200d comprises a client application 131 displaying a digital content item 121 (e.g. a network-page for purchasing concert tickets) on a display 129 of client computing device 106 (FIG. 1). The client application 131 presents a trigger 203 on display 129 to provide notice that client application 131 has received a list of related digital media content items 121 from the media analysis application 126 (FIG. 1). It is understood that the client application 131 and the digital content item 121 are not limited to network-pages but could also correspond to an email application and an email, an e-book reader application and an e-book, or any of a multitude of applications designed to consume digital media content and their corresponding digital media content.

Figure 2E:
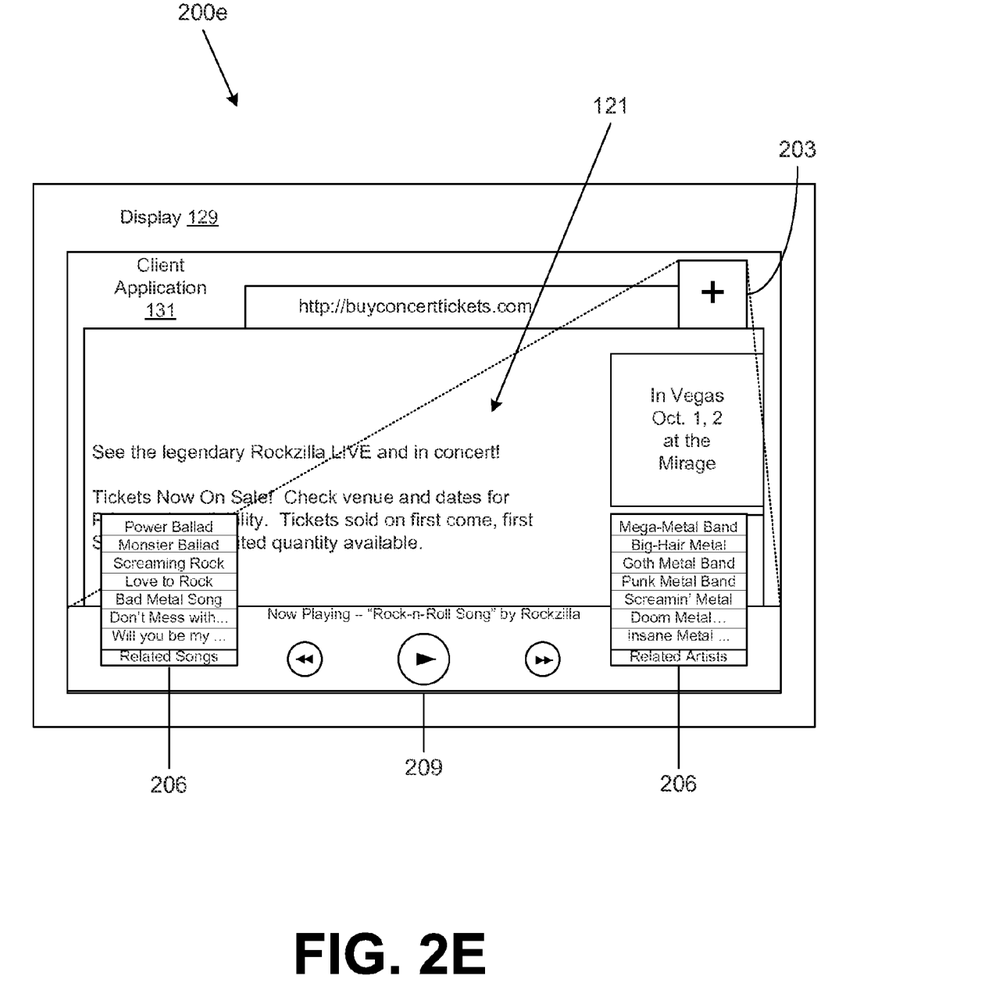

Following is FIG. 2E, which shows another example of user interface 200, denoted herein as user interface 200e, generated by the client application 131. In this particular embodiment, the trigger 203 in the user interface 200d has received a user interaction. In response, user interface 200e has overlaid a media player 209, which permits a user to play a related digital media content item 121 on client computing device 106 (FIG. 1) from one of two lists 206 of digital media content items 121. It is understood that the user may continue to interact with the original digital content item 121, in this case the network page, while the media player 209 renders the related digital media content item 121, in this case a related song. Therefore, the user of the client application 131 never has to break the context of the original task, in this case purchasing concert tickets.

Figure 3:
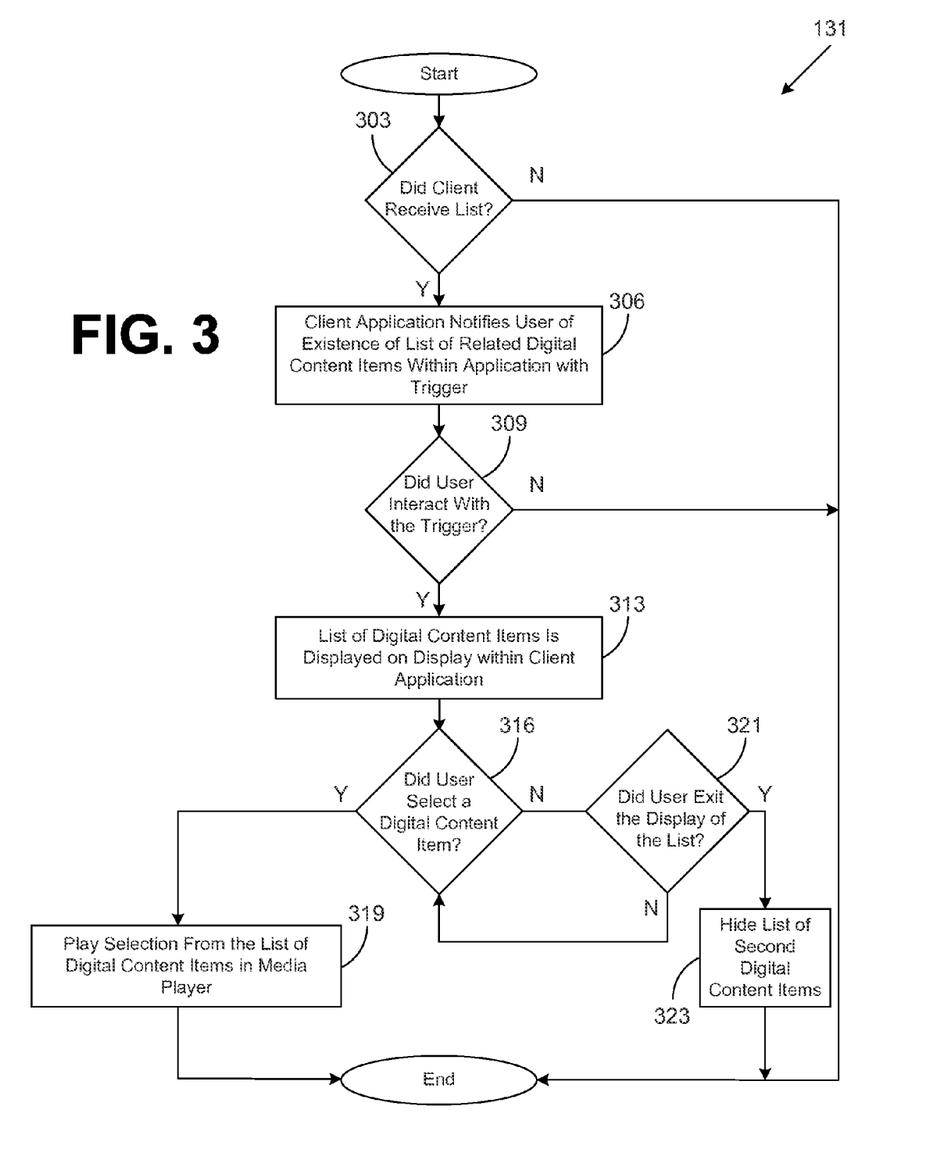
FIG. 3 is a flowchart illustrating one example of a client application's interaction with a media analysis application executed in a computing environment or a client computing device in the networked environments of FIG. 1A or FIG. 1B according to various embodiments of the present disclosure.

Referring next to FIG. 3, shown is a flowchart that provides one example of the operation of a portion of the client application 131 according to various embodiments. It is understood that the flowchart of FIG. 3 provides merely an example of the many different types of functional arrangements that may be employed to implement the operation of the portion of the client application 131 as described herein. As an alternative, the flowchart of FIG. 3 may be viewed as depicting an example of steps of a method implemented in the client computing device 106 (FIG. 6) according to one or more embodiments.

FIG. 3 involves functionality that implements the changes in the user interface 200 (FIGS. 2A-2E) rendered by the client application 131 on the display 129 (FIG. 1) of the client computing device 106 (FIG. 1) in response to user interactions obtained by the client computing device 106 on behalf of the client application 131. It is assumed that the client application 131 has already requested and received a digital media content item 121 (FIG. 1) from a media server application 123 (FIG. 1) which is currently being rendered. It is further assumed that the client application 131 has already requested a list of digital media content items from the media analysis application 126 (FIG. 1) that are related to the digital media content item that is currently being rendered. Details on how the list may be generated are disclosed in the discussion of FIG. 4 to follow.

Beginning with box 303, the client application 131 determines whether it has received a list of related digital media content items 121 from the media analysis application 126. If no list is received, then execution ends. It is understood that in the event that no related digital media content items 121 exist, the media analysis application 126 may take further action such as logging the fact that no related items were found. However, if the client application 131 does receive a list, then execution proceeds to box 306.

Proceeding to box 306, the client application 131 renders a trigger 203 on the display 129 as a part of user interface 200, that provides a notification of the existence of a list of digital media content items 121 that are related to the initial digital media content item currently rendered on the display 129. It is understood that the trigger may take many forms when rendered, including a button within the user interface 200 of client application 131, a system notice on behalf of client application 131, or other forms.

In box 309, the client application 131 waits to see if the user manipulated the trigger 203 within a predefined period of time. If no user interaction is obtained, the client computing device 106 ends as shown. If a user interaction is obtained, then the client application 131 proceeds to box 313.

In box 313, the client computing device 106 displays the list of digital media content items 121 on display 129. In one particular embodiment, depicted in FIG. 2B, the list is overlaid on top of the initial digital media content item 121. This permits a user of the client application 131 to interact with the individual digital media content items 121 of the list without switching to another application or breaking the current context of client application 131. In another embodiment, depicted in FIG. 2E, the list is a pop-up that expands from a button within the embedded the media player 209 (FIG. 2). It is understood that other embodiments of the invention may display the list in other ways.

Proceeding to box 316, the client computing device 106 checks to determine if it has obtained a user interaction indicating that a user has selected one of the digital media content items 121 on the list for consumption. If so, then the client computing device 106 proceeds to box 319 and renders the selected digital media content item 121 within media player 209 of the user interface 200 for client application 131. Depending on the selection made by the user, playback of the selected digital media content item 121 may be associated with a simultaneous purchase of the digital media content item 121, some form of free play, such as playback of a trailer of a movie or song from a promoted album, or other associated transaction related to the user selection. Thereafter, this portion of the function of the client application 131 ends.

As an alternative, if no user interaction selecting one of the digital media content items 121 from the list is obtained, then execution proceeds to box 321. The client computing device 106 in box 321 checks to see if it has obtained a user interaction to exit the display of the list of digital media content items 121. If a user interaction is obtained, then execution proceeds to box 323, where the list of digital media content items 121 ceases rendering on display 129 and no further action is taken. If a user interaction exiting the display of the list is not obtained, execution returns to box 316. In this particular embodiment, execution can loop between box 321 and box 316 while the client computing device 106 waits to obtain a user interaction. In some embodiments of the invention, the client computing device 106 will continue to render the list of digital media content items 121 until a user interaction is obtained which either selects a digital media content item 121 or exits the list.

Figure 4:
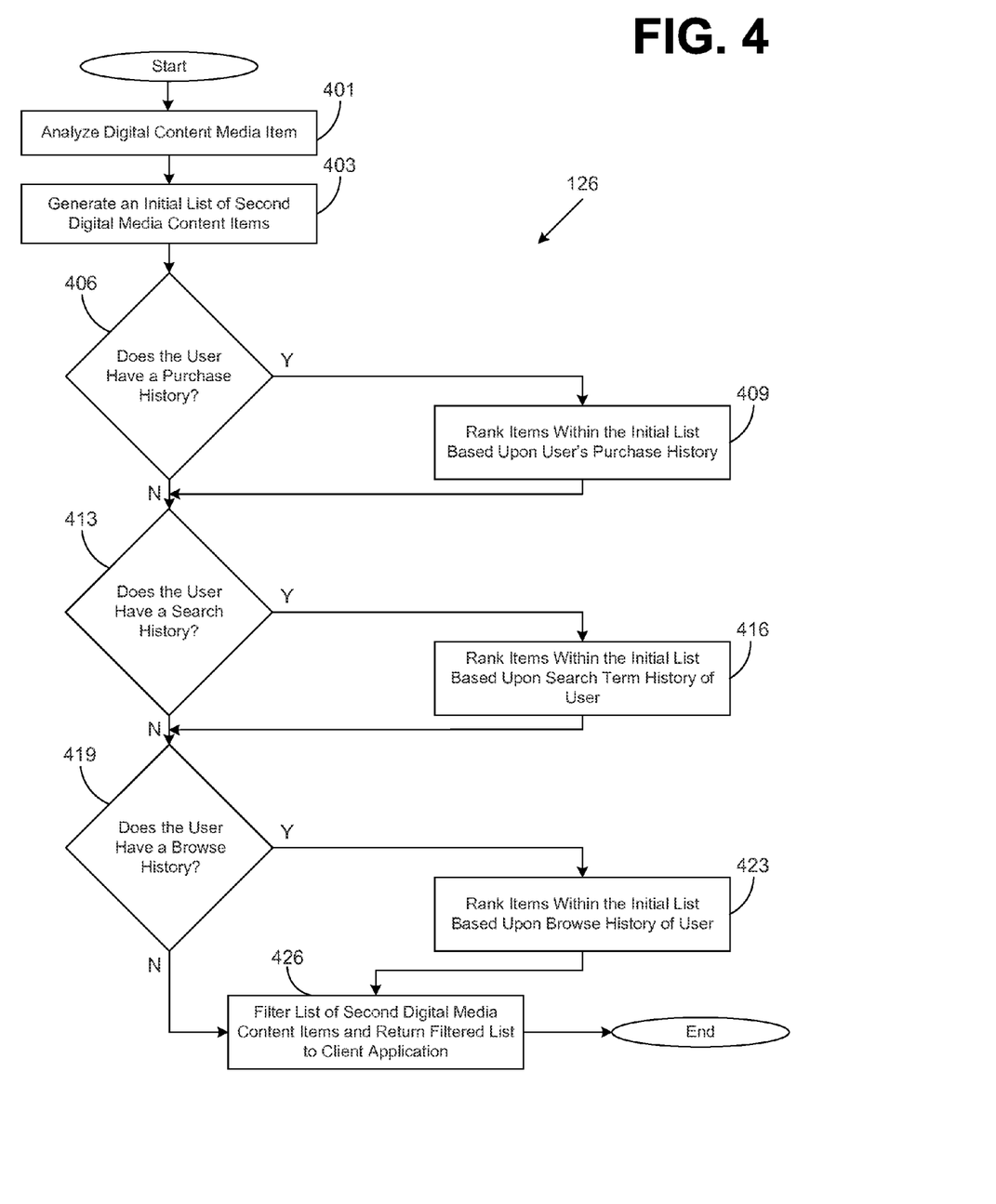
FIG. 4 is a flowchart illustrating one example of functionality implemented as portions of a media analysis application executed in a computing environment or a client computing device in the networked environments of FIG. 1A or FIG. 1B according to various embodiments of the present disclosure.

Referring next to FIG. 4, shown is a flowchart that provides one example of the operation of a portion of the media analysis application 126 according to various embodiments. It is understood that the flowchart of FIG. 4 provides merely an example of the many different types of functional arrangements that may be employed to implement the operation of the portion of the media analysis application 126 as described herein. As an alternative, the flowchart of FIG. 4 may be viewed as depicting an example of steps of a method implemented in the computing environment 103 (FIG. 1) or on client computing device 106 (FIG. 1) according to one or more embodiments. The steps depicted in FIG. 4 may be performed in a different sequence than depicted by FIG. 4 or may be performed in parallel. Additionally, steps may be added to or removed from the method or functional arrangement depicted in FIG. 4 as warranted by the particular information. For example, various implementations may process available data other than the data depicted in FIG. 4. Alternatively, various implementations may choose to conduct less data processing than depicted in FIG. 4.

FIG. 4 embodies the interactions between a client application 131 (FIG. 1) executing on a client computing device 106 and a media analysis application 126. It is assumed that the client application 131 has already requested and received a digital media content item 121 (FIG. 1) from a media server application 123 (FIG. 1). It is further assumed that the digital media content item 121 has been forwarded upon receipt by the client application 131 to the media analysis application 126.

Beginning with box 401, the media analysis application 126 analyzes a digital media content item 121 that it has received from the client application 131.

Next, in box 403, the media analysis application 126 generates an initial list of digital media content items 121 that are related to the initial digital media content item 121 received from the client computing device 106.

Proceeding to box 406, the media analysis application 126 determines whether the digital media content item 121 received from the client application 131 executing on the client computing device 106 is associated with a user account that has purchase history data 113 (FIG. 1). If associated purchase history data 113 exists, then execution of the media analysis application proceeds to box 409. Otherwise, execution of the media analysis application proceeds to box 413.

If execution proceeds to box 409, the media analysis application 126 determines the relationship between each digital media content item 121 in the list and the purchase history data 113. The media analysis application 126 may then assign a rank or weight to each digital media content item 121 within the list, whereby the rank or weight represents the degree of relationship between the digital media content item 121 and the purchase history data 113, and higher rank or greater weight denotes a greater degree of relationship. In particular embodiments of the present disclosure, clustering algorithms such as k-means clustering or expectation-means clustering may be used to generate ranks or weights. Alternatively, relationship mapping algorithms can be used to generate ranks or weights, wherein the rank or weight is equal to the number of relationships between a digital media content item 121 within the list and the initial digital media content item 121. Selection may then proceed according to rank or weight. Execution then proceeds to box 413, where further processing of the list of digital media content items 121 may occur.

Proceeding to box 413, the media analysis application 126 determines whether the digital media content item 121 received from the client application 131 executing on the client computing device 106 is associated with a user account that has search term data 116 from prior searches performed, for example, in an electronic commerce system. If associated search term data 116 exists, then execution of the media analysis application proceeds to box 416. Otherwise, execution of the media analysis application proceeds to box 419.

If execution proceeds to box 416, the media analysis application 126 determines the relationship between each digital media content item 121 in the list and the search term data 116. The media analysis application 126 may assign a rank or weight to each digital media content item 121 within the list, whereby the rank or weight represents the degree of relationship between the digital media content item 121 and the search term data 116, and higher rank or greater weight denotes a greater degree of relationship. In particular embodiments of the present disclosure, clustering algorithms such as k-means clustering or expectation-means clustering may be used to generate ranks or weights. Alternatively, relationship mapping algorithms can be used to generate ranks or weights, wherein the rank or weight is equal to the number of relationships between a digital media content item 121 within the list and the initial digital media content item 121.

Proceeding to box 419, the media analysis application 126 determines whether the digital media content item 121 received from the client application 131 executing on the client computing device 106 is associated with a user account that has browse history data 136. If associated browse history data 136 exists, then execution of the media analysis application proceeds to box 423. Otherwise, execution of the media analysis application proceeds to box 426.

If execution proceeds to box 423, the media analysis application 126 determines the relationship between each digital media content item 121 in the list and the browse history data 136. The media analysis application 126 may assign a rank or weight to each digital media content item 121 within the list, whereby the rank or weight represents the degree of relationship between the digital media content item 121 and the browse history data 136, and higher rank or weight corresponds to a greater degree of relationship. In particular embodiments of the present disclosure, clustering algorithms such as k-means clustering or expectation-means clustering may be used to generate ranks or weights. Alternatively, relationship mapping algorithms can be used to generate ranks or weights, wherein the rank or weight is equal to the number of relationships between a digital media content item 121 within the list and the initial digital media content item 121. Selection may then proceed according to rank or weight. Execution then proceeds to box 426.

Proceeding to box 426, the final version of the list of digital media content items 121 is filtered according to predetermined criteria. Filtering may involve reordering the list based upon the weight or rank assigned to individual items within the list. Filtering may also consist of delimiting the list and returning a subset of the items that correspond to the most highly ranked or weighted items of the list. The filtered list is then returned to the client application 131 executing on the client computing device 106.

Figure 5:
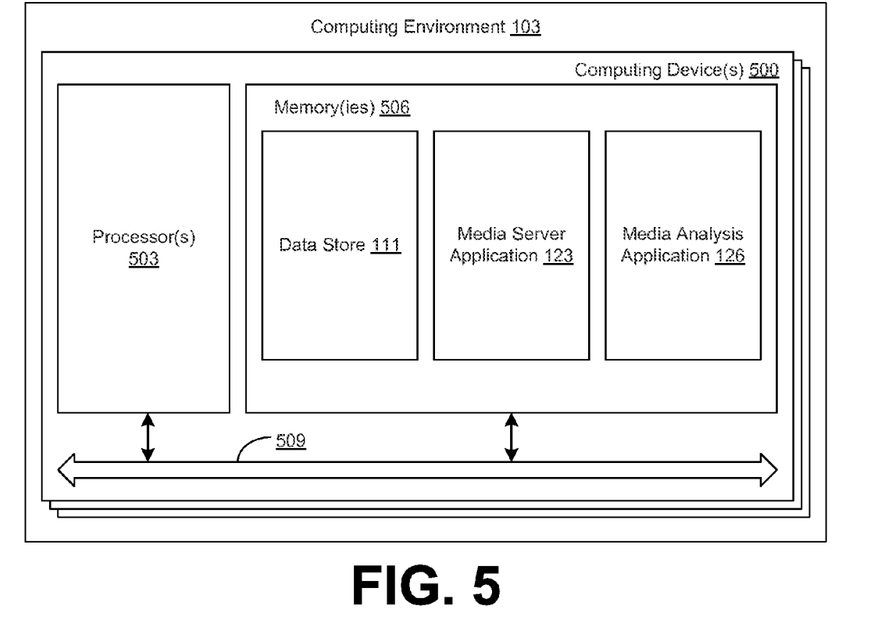
FIG. 5 is a schematic block diagram that provides one example illustration of a computing environment employed in the networked environment of FIG. 1A or FIG. 1B according to various embodiments of the present disclosure.

With reference to FIG. 5, shown is a schematic block diagram of the computing environment 103 according to an embodiment of the present disclosure. The computing environment 103 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are media server application 123 and media analysis application 126, and potentially other applications. Also stored in the memory 506 may be a data store 111 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Figure 6:
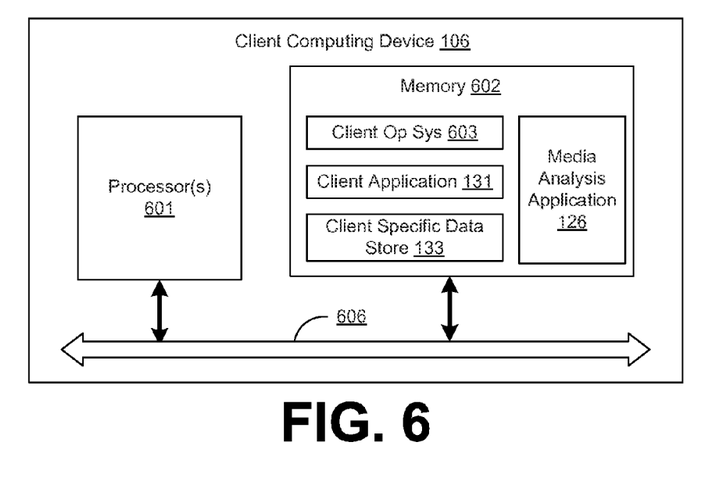
FIG. 6 is a schematic block diagram that provides one example illustration of a client computing device employed in the networked environment of FIG. 1A and FIG. 1B according to various embodiments of the present disclosure.

With reference to FIG. 6, shown is a schematic block diagram of the client computing device 106 according to an embodiment of the present disclosure. The client computing device 106 includes at least one processor circuit, for example, having a processor 601 and a memory 602, both of which are coupled to a local interface 606. To this end, the client computing device 106 may comprise a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The local interface 606 may comprise, for example, a data bus with an accompanying address/control bus or other bus structure as can be appreciated.

Stored in the memory 602 are both data and several components that are executable by the processor 601. In particular, stored in the memory 602 and executable by the processor 601 are the client application 131 and, in at least one embodiment of the present disclosure, the media analysis application 126 as well as potentially other applications. Also stored in the memory 602 may be a client specific data store 133 and other data. In addition, a client operating system 603 may be stored in the memory 602 and executable by the processor 601.

It is understood that there may be other applications that are stored in the memory 602 and are executable by the processor 601 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 602 and are executable by the processor 601. In this respect, the term "executable" means a program file that is in a form that can ultimately be run by the processor 601. Examples of executable programs may be, for example, a compiled program that can be translated into machine code in a format that can be loaded into a random access portion of the memory 602 and run by the processor 601, source code that may be expressed in proper format such as object code that is capable of being loaded into a random access portion of the memory 602 and executed by the processor 601, or source code that may be interpreted by another executable program to generate instructions in a random access portion of the memory 602 to be executed by the processor 601, etc. An executable program may be stored in any portion or component of the memory 602 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 602 is defined herein as including both volatile and nonvolatile memory and data storage components. Volatile components are those that do not retain data values upon loss of power. Nonvolatile components are those that retain data upon a loss of power. Thus, the memory 602 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 601 may represent multiple processors 601 and/or multiple processor cores and the memory 602 may represent multiple memories 602 that operate in parallel processing circuits, respectively. In such a case, the local interface 606 may be an appropriate network that facilitates communication between any two of the multiple processors 601, between any processor 601 and any of the memories 602, or between any two of the memories 602, etc. The local interface 606 may comprise additional systems designed to coordinate this communication, including, for example, performing load balancing. The processor 601 may be of electrical or of some other available construction.

Although the media analysis application 126, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 3 shows the functionality and operation of an implementation of portions of the client application 131. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

The flowchart of FIG. 4 shows the functionality and operation of an implementation of portions of the media analysis application 126. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system, a processor 601 in a client computing device, or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted; while in other embodiments, additional blocks may be added. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the client application and the media analysis application, that comprises software or code can be embodied in any non-transitory computer-readable medium for use by or in connection with an instruction execution system such as, for example, a processor 503 or 601 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, comprising a set of instructions that, when executed by a processor of the at least one computing device, cause the at least one computing device to at least:

analyze a network page to generate a list of digital media content items in response to receiving a copy of the network page from a client application, wherein individual ones of the list of digital media content items are related to the network page;

filter the list of digital media content items based at least in part on the contents of the network page, wherein the contents of the network page comprise text;

filter the list of digital media content items based at least in part on information associated with an account of a user, wherein:
- the information comprises at least one of a purchase history, a browse history, a search history, or demographic data;
- individual elements of the list of digital media content items are compared to a respective item of the information;
- individual elements of the list of digital media content items are assigned a score based at least in part on a relationship of the individual elements of the list of digital media content items with the respective item of the information; and
- a predetermined number of the digital media content items are selected from the list of digital media content items based at least in part on the score assigned to the individual elements of the list of digital media content items; and provide a filtered list of digital media content items to the client application.

2. The non-transitory computer-readable medium of claim 1, wherein the browse history and the search history are stored in at least one client specific data store in a client computing device.

3. The non-transitory computer-readable medium of claim 1, wherein the purchase history and the demographic data are stored in at least one server computing device.

4. A system, comprising:
- at least one computing device comprising a processor and a memory; and
- an application executable in the at least one computing device, the application comprising a set of instructions stored in the memory of the at least one computing device that, when executed by the processor of the at least one computing device, cause the at least one computing device to at least:
  - analyze a network page to generate a list of digital media content items in response to receiving a request from a client application executing on a client computing device, wherein individual ones of the digital media content items are related to the network page;
  - provide the list of digital media content items to the client application;
  - instruct the client application to store the list of digital media content items; and
  - instruct the client application to render one or more of the digital media content items.

5. The system of claim 4, wherein the application further comprises instructions that, when executed by the processor of the at least one computing device, cause the at least one computing device to at least filter the list of digital media content items based at least in part upon a content of the network page, wherein the content of the network page comprises text.

6. The system of claim 4, wherein the application further comprises instructions that, when executed by the processor of the at least one computing device, cause the at least one computing device to at least filter the list of digital media content items based at least in part upon information associated with an account of a user.

7. The system of claim 6, wherein the information associated with the account of the user includes a browser history.

8. The system of claim 6, wherein the information associated with the account of the user includes a search history.

9. The system of claim 6, wherein the information associated with the account of the user includes a purchase history.

10. A computer-implemented method, comprising:
- rendering on a display of a computing device a first digital media content item previously requested by an application executing in the computing device, wherein the first digital media content item comprises a network page;
- rendering on the display of the computing device a user interface element, the user interface element providing a notification that a list of a plurality of second digital media content items has been received by the computing device, wherein individual ones of the list of the plurality of second digital media content items are related to the first digital media content item;
- rendering the list of the plurality of second digital media content items on the display of the computing device in response to a user interaction with the user interface element; and
- rendering, via the computing device, at least one digital media content item identified in the list of the plurality of second digital media content items in response to a user selection of the at least one digital media content item identified in the list of the plurality of second digital media content items.

11. The computer-implemented method of claim 10, wherein the user selection of the at least one digital media content item identified in the list comprises a purchase of the at least one digital media content item identified in the list.

12. The computer-implemented method of claim 11, wherein rendering the second digital media content item is contemporaneous with the purchase of the second digital media content item.

13. The computer-implemented method of claim 10, further comprising filtering the list of the plurality of second digital media content items based at least in part upon the contents of the first digital media content item.

14. The computer-implemented method of claim 13, wherein filtering the list of the plurality of second digital media content items is accomplished by:
- assigning, via the computing device, a rank to individual ones of the second digital media content items representing a degree of relevancy for the individual ones of the second digital media content items with respect to the first digital media content item; and
- subsequently choosing, via the computing device, a predetermined number of most relevant ones of the second digital media content items.

15. The computer-implemented method of claim 10, further comprising filtering, via the computing device, the list of the plurality of second digital media content items based at least in part upon a purchase history of a user.

16. The computer-implemented method of claim 15, wherein the filtering is accomplished by:
- determining, via the computing device, a degree of relation between individual ones of the list of the plurality of second digital media content items and at least one purchase occurring within a predefined period of time;
- assigning, via the computing device, a relatedness weight to the individual ones of the list of the plurality of second digital media content items, wherein the relatedness weight expresses a degree of relation between a respective one of the list of plurality of the second digital media content items and the at least one purchase; and selecting, via the computing device, a predetermined number of second digital media content items from the list of the plurality of second digital media content items based at least in part upon the relatedness weight.

17. The computer-implemented method of claim 10, further comprising filtering, via the computing device, the list of the plurality of second digital media content items based at least in part upon information associated with an account of a user.

18. The computer-implemented method of claim 17, wherein the information comprises demographic data associated with the account of the user and the computer-implemented method further comprises:
- determining, via the computing device, a customer demographic corresponding to individual ones of the list of the plurality of second digital media content items, wherein the customer demographic embodies a segment of users that are most likely to consume the individual ones of the list of the plurality of second digital media content items;
- assigning, via the computing device, a demographic weight to individual ones of the list of the plurality of second digital media content items, wherein the demographic weight expresses a degree of overlap between the customer demographic and the demographic data associated with the account of the user; and
- selecting, via the computing device, a predetermined number of second digital media content items from the list of the plurality of second digital media content items based at least in part upon the demographic weight.

19. The computer-implemented method of claim 17, wherein the filtering is accomplished by:
- determining, via the computing device, a degree of similarity between individual ones of the list of the plurality of second digital media content items and the information associated with the account of the user;
- assigning, via the computing device, a similarity weight to the individual ones of the list of the plurality of second digital media content items, wherein the similarity weight expresses a degree of similarity between a respective one of the list of the plurality of second digital media content items and the information associated with the account of the user; and
- selecting, via the computing device, a predetermined number of second digital media content items from the list of the plurality of second digital media content items based at least in part upon the similarity weight.

20. The computer-implemented method of claim 17, wherein the information comprises behavioral data.

* * * * *